UNITED STATES PATENT OFFICE.

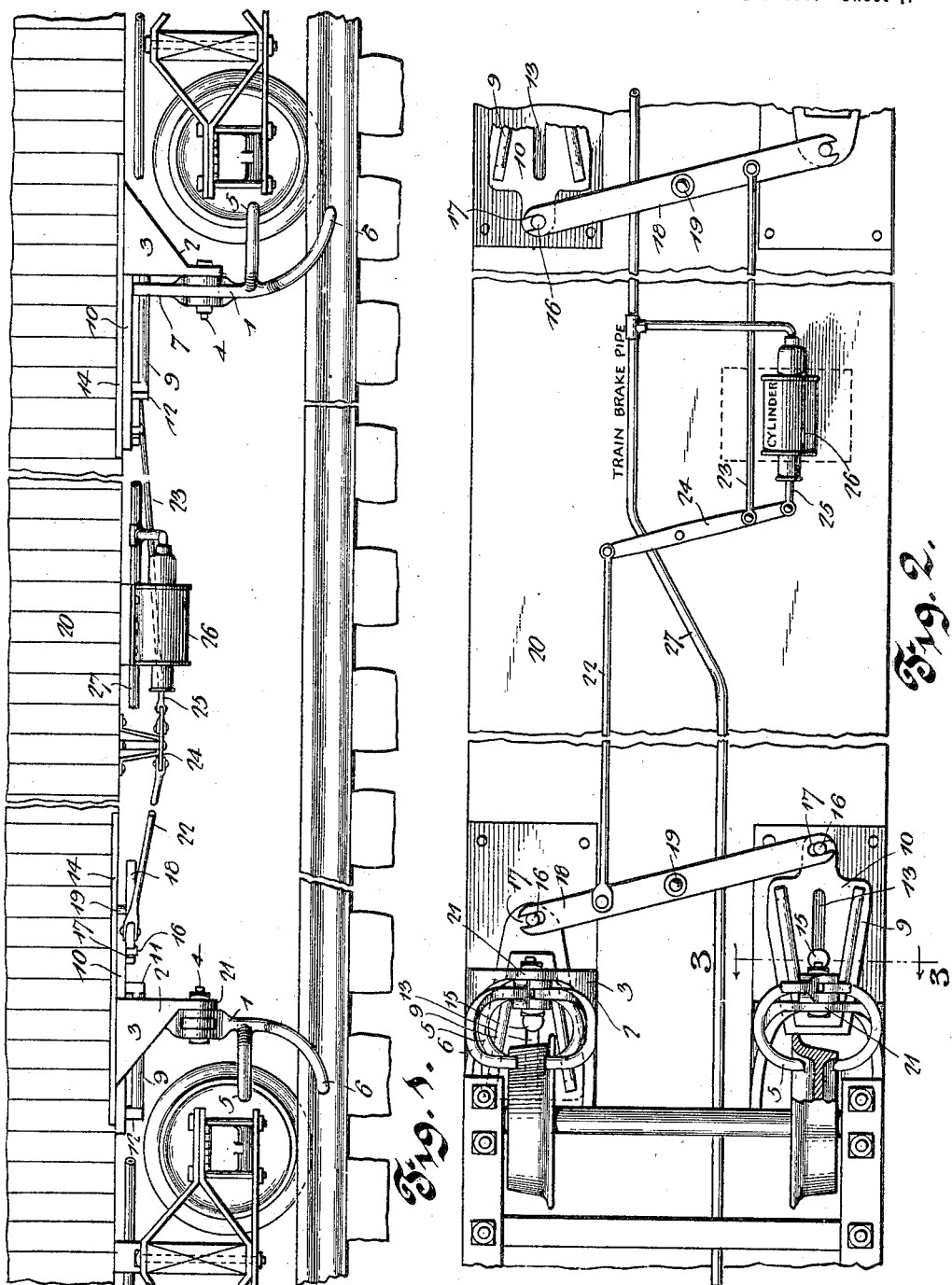

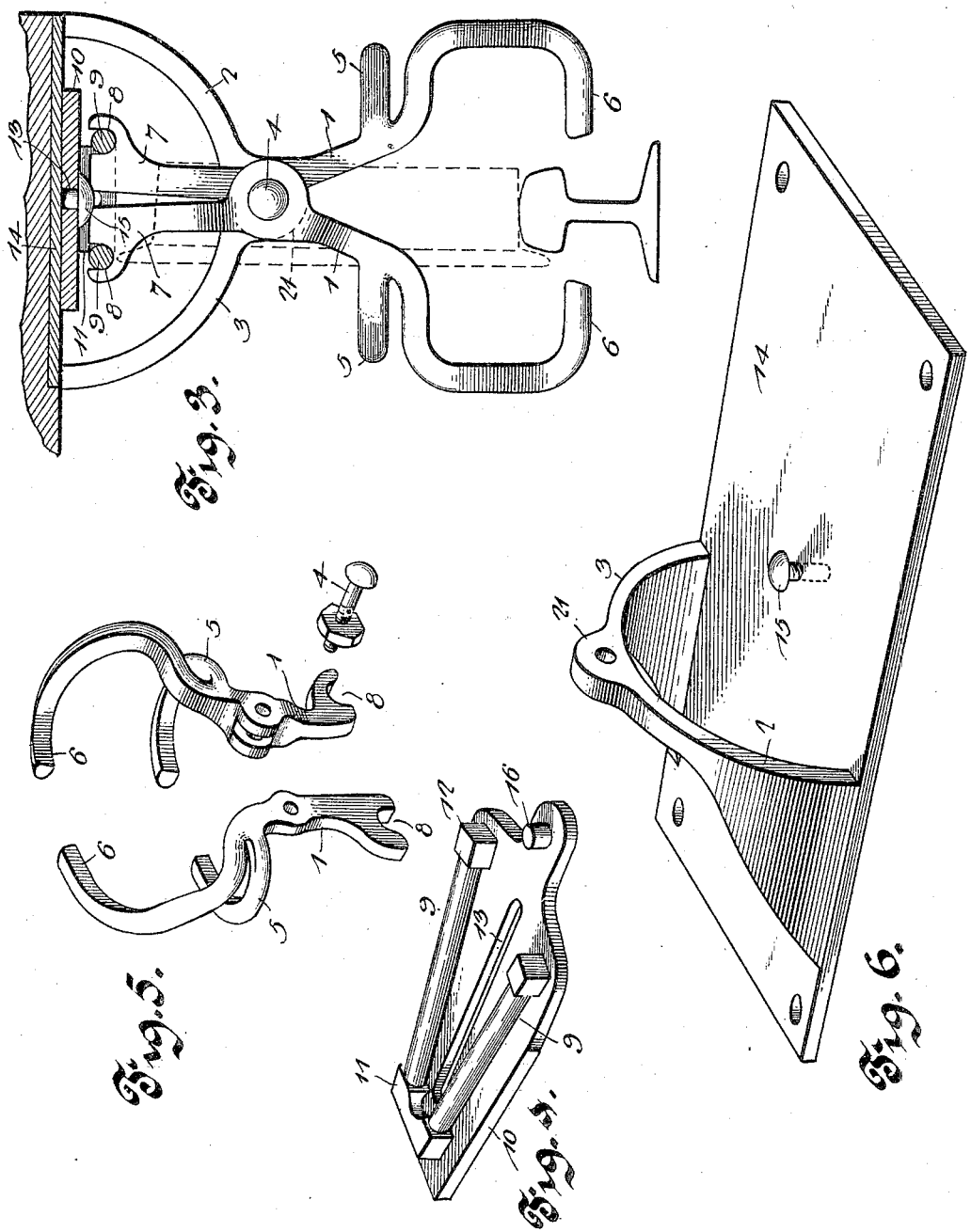

HARRY WISE, OF SAN ANTONIO, TEXAS, ASSIGNOR OF THREE-FOURTHS TO HENRY BOERNER, OF SAME PLACE.

CAR-BRAKE.

SPECIFICATION forming part of Letters Patent No. 680,904, dated August 20, 1901.

Application filed December 29, 1900. Serial No. 41,532. (No model.)

*To all whom it may concern:*

Be it known that I, HARRY WISE, a citizen of the United States, residing at San Antonio, in the county of Bexar and State of Texas, have invented a new and useful Car-Brake, of which the following is a specification.

The invention relates to improvements in car-brakes.

The object of the present invention is to improve the construction of brakes for railway-cars and to provide a simple and comparatively inexpensive one of great strength and durability designed for railroads in mountainous districts, inclined railways, and the like and adapted to be operated by compressed air from a locomotive in the usual manner and capable of firmly gripping the wheels and the rails and of checking the forward movement of a train and of effectually preventing a car from leaving the rails in event of an accident.

The invention consists in the construction and novel combination and arrangement of parts hereinafter fully described, illustrated in the accompanying drawings, and pointed out in the claims hereto appended.

In the drawings, Figure 1 is a side elevation of a portion of a car provided with a brake constructed in accordance with this invention. Fig. 2 is a reverse plan view of the same. Fig. 3 is an enlarged sectional view on the line 3 3 of Fig. 2. Fig. 4 is a detail perspective view of one of the reciprocating slides. Fig. 5 is a detail perspective view of the clutch-levers for engaging the wheels and rails. Fig. 6 is a detail perspective view of the bracket or hanger.

Like numerals of reference designate corresponding parts in all the figures of the drawings.

1 1 designate a pair of clutch-levers fulcrumed between their ends on a depending substantially semicircular portion 2 of a bracket or hanger 3 and provided at their lower portions at points below the pivot 4 with approximately horizontal wheel-engaging arms 5 and with depending slightly-inclined rail-engaging arms 6, which are slightly curved in side elevation, as clearly shown in Fig. 1 of the accompanying drawings. The arms 5, which engage the wheels, are approximately U-shaped and are adapted to engage the said wheels within the rims thereof, and the depending arms 6, which are also approximately U-shaped in end elevation, as shown in Fig. 3, are adapted to engage under the head of the rail. By this construction and arrangement the wheels and the rails are simultaneously clamped and the former is retained on the latter and a car in event of accident is prevented from jumping the rails. This construction also adapts the brake for use on railroads in mountainous districts and for use on inclined railways and the like.

The upper arms 7 of the clutch or gripping levers are enlarged at their upper ends and are provided with recesses or notches 8, in which are arranged divergent guides 9 of a slide 10, whereby when the latter is reciprocated the levers will be oscillated and caused to grip and release the wheels and the rails. The divergent guides 9 are preferably rounded and are connected with lugs or bosses 11 and 12 of the slide 10 and are offset from the same, as clearly shown in Fig. 3, and the walls of the recesses or notches 8 are curved to conform to the configuration of the guides 9. The slide 10, which is tapering, as shown, is provided with a longitudinal slot 13 and is secured to a plate 14 of the bracket 3 by means of a suitable fastening device 15, located at the center of the plate 14. The slide is provided at one end with a suitable pivot 16, which is arranged in a bifurcation 17 of a transverse lever 18, fulcrumed between its ends at 19 and connecting a pair of oppositely-disposed slides, which have reversely-arranged guides, as clearly shown in Fig. 2, whereby when the lever 18 is oscillated the gripping-levers will be similarly operated. The pivot 16 may consist of a stud, as shown in Fig. 4, or it may be constructed in any suitable manner and can consist of a fastening device. The bracket or hanger 3, which is secured to the bottom of the car 20, as clearly illustrated in Figs. 1 and 2 of the accompanying drawings, consists of the plate 14 and the said depending semicircular portion 2, which is provided at its bottom with a perforated ear 21 for the reception of the pivot of the gripping-levers. The slides are adapted to reciprocate within the depending semicircular portions of the hangers or brackets, and the divergent guides produce a positive operation of the gripping or clutch levers 1.

The brake is adapted to be operated by compressed air in the usual manner, and the transverse brake-levers 18 are connected by rods 22 and 23 with a central or intermediate lever 24, and the latter has one end connected with the piston 25 and the ordinary air-brake cylinder 26, which is connected with the train-pipe 27 in the ordinary manner, whereby the brakes of the cars will be under the control of the engineer, similar to the ordinary air-brakes.

It will be seen that the car-brake is exceedingly simple and inexpensive in construction, that it is positive and reliable in operation, and that it is capable of firmly gripping the rails and the wheels and of positively locking the latter on the former, so that a car in event of an accident will be effectually prevented from leaving the rails. It will also be seen that the brake is adapted to be operated by compressed air in the ordinary manner and that it is especially adapted for use on railroads in mountainous districts and for use on inclined railways and the like.

What is claimed is—

1. In a device of the class described, the combination of a pair of gripping or clutch levers provided with arms arranged to receive the rim of a car-wheel and the head of a rail and adapted to engage simultaneously the wheel and the rail, whereby the former will be locked on the latter, and means for operating the levers, substantially as described.

2. In a device of the class described, the combination of a pair of levers provided with approximately U-shaped arms arranged to engage a wheel within the rim and adapted to engage a rail under the head thereof, whereby the wheel will be securely held on the rail, and means for locking the levers, substantially as described.

3. In a device of the class described, the combination of a pair of levers provided with depending and horizontal arms, the depending arms being arranged to engage the opposite sides of a rail beneath the head thereof, and the horizontal arms being arranged to engage the opposite sides of a wheel within the rim of the same, whereby the wheel will be securely locked on the rail, and means for operating the levers, substantially as described.

4. In a device of the class described, the combination of a pair of levers fulcrumed between their ends and provided at their lower portions with arms arranged to engage the opposite sides of a wheel and a rail, a reciprocating slide provided with diverging guides connected with the upper portions of the levers, and means for operating the slides, substantially as described.

5. In a device of the class described, the combination of a pair of levers fulcrumed between their ends and provided at their upper terminals with recesses, and a reciprocating slide provided with divergent guides arranged in the said recesses and adapted to actuate the levers, substantially as described.

6. In a device of the class described, the combination of a pair of levers, arranged to swing transversely of the rails, a hanger or bracket supporting the levers, and a slide reciprocating longitudinally of the rails and provided with divergent guides connected with the levers and adapted to actuate the same, substantially as described.

7. In a device of the class described, the combination with a car, of levers arranged in pairs at opposite sides thereof, the slides located at opposite sides of the car and provided with reversely-arranged divergent guides, a transverse lever connecting the slides, and means for operating the lever, substantially as described.

In testimony that I claim the foregoing as my own I have hereto affixed my signature in the presence of two witnesses.

HARRY WISE.

Witnesses:
G. W. BUTCHER,
CHAS. E. WYNNE, Jr.